United States Patent
Yang et al.

(10) Patent No.: US 9,197,122 B2
(45) Date of Patent: Nov. 24, 2015

(54) LOAD DRIVE CIRCUIT, LOAD DRIVE METHOD, AND LUMINAIRE

(71) Applicant: OSRAM GmbH, Munich (DE)

(72) Inventors: Xusheng Yang, Guangdong (CN);
Shaoping Chen, Guangdong (CN);
Xiongqiang He, Guangdong (CN);
Qingfu Zhang, Guangdong (CN)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 14/399,206

(22) PCT Filed: May 8, 2013

(86) PCT No.: PCT/EP2013/059658
§ 371 (c)(1),
(2) Date: Nov. 6, 2014

(87) PCT Pub. No.: WO2013/167695
PCT Pub. Date: Nov. 14, 2013

(65) Prior Publication Data
US 2015/0123568 A1      May 7, 2015

(30) Foreign Application Priority Data
May 11, 2012    (CN) .......................... 2012 1 0147097

(51) Int. Cl.
*H02M 1/14*     (2006.01)
*H05B 33/08*    (2006.01)

(52) U.S. Cl.
CPC ............. *H02M 1/14* (2013.01); *H05B 33/0806* (2013.01); *H05B 33/0812* (2013.01); *H05B 33/0851* (2013.01); *Y02B 20/345* (2013.01)

(58) Field of Classification Search
None
See application file for complete search history.

(56) References Cited

U.S. PATENT DOCUMENTS

| | | | |
|---|---|---|---|
| 3,895,275 A * | 7/1975 | Rostad | 318/798 |
| 6,411,531 B1 * | 6/2002 | Nork et al. | 363/60 |
| 2006/0220571 A1 | 10/2006 | Howell et al. | |
| 2008/0150877 A1 | 6/2008 | Chao et al. | |
| 2009/0261790 A1 * | 10/2009 | Arduini | 323/266 |
| 2009/0284180 A1 | 11/2009 | Shen et al. | |
| 2009/0322252 A1 | 12/2009 | Shiu et al. | |
| 2010/0117458 A1 * | 5/2010 | Reithmayer et al. | 307/131 |

FOREIGN PATENT DOCUMENTS

EP        2149871 A2    2/2010

OTHER PUBLICATIONS

International Search Report issued in PCT/EP2013/059658 on Mar. 19, 2014.

* cited by examiner

*Primary Examiner* — Crystal L Hammond

(57) ABSTRACT

A load drive circuit may include a DC power source configured to provide a DC output voltage for at least one load based on an output voltage of an AC/DC converter, the DC output voltage having a ripple, a variable resistance module connected to the load, a ripple reduction module that generates, based on a reference voltage and a feedback signal from the load, a variable resistance adjusting signal for adjusting the resistance of the variable resistance module so as to reduce a ripple of the load current, wherein the reference voltage is generated based on the DC output voltage, and a reference voltage adjusting module that adjusts the average value of the reference voltage based on the variable resistance adjusting signal, so as to make the average value of the reference voltage approach the average value of the feedback signal as much as possible.

19 Claims, 5 Drawing Sheets

LOAD DRIVE CIRCUIT, LOAD DRIVE METHOD, AND LUMINAIRE

RELATED APPLICATIONS

The present application is a national stage entry according to 35 U.S.C. §371 of PCT application No.: PCT/EP2013/059658 filed on May 8, 2013, which claims priority from Chinese application No.: 201210147097.X filed on May 11, 2012, and is incorporated herein by reference in its entirety.

TECHNICAL FIELD

Various embodiments generally relate to a load drive circuit and a load drive method, and more particularly, to a load drive circuit and a load drive method for reducing a ripple of a load current. Various embodiments also relate to a luminaire using the load drive circuit and the load drive method.

BACKGROUND

As for a load supplied with DC power, the DC voltage supplied to the load generally has a ripple which will result in a ripple of the load current. The magnitude of the ripple of the load current may have a great impact on the operating state, efficiency and so on of the load, and thus it is very important to effectively reduce the ripple of the load current.

SUMMARY

The present disclosure is made in the light of the foregoing problems. The present disclosure is intended to provide a load drive circuit and a load drive method which can effectively reduce the ripple of the load current.

According to various embodiments, there is provided a load drive circuit for reducing a ripple of a load current flowing through at least one load. The circuit includes: a DC power source configured to provide a DC output voltage for at least one load based on an output voltage of an AC/DC converter, the DC output voltage having a ripple; a variable resistance module that is connected to the load; a ripple reduction module that generates, based on a reference voltage and a feedback signal from the load, a variable resistance adjusting signal for adjusting the resistance of the variable resistance module so as to reduce a ripple of the load current, wherein the reference voltage is generated based on the DC output voltage; and a reference voltage adjusting module that adjusts the average value of the reference voltage based on the variable resistance adjusting signal, so as to make the average value of the reference voltage approach the average value of the feedback signal as much as possible.

According to various embodiments, there is provided a load drive method for reducing a ripple of a load current flowing through at least one load. The method includes: generating a reference voltage based on a DC output voltage of a DC power supply with an AC/DC converter; based on the reference voltage and a feedback signal from the load, generating a variable resistance adjusting signal for adjusting a resistance value of a variable resistance module connected to the load, so as to reduce the ripple of the load current; and adjusting an average value of the reference voltage based on the variable resistance adjusting signal, so as to make the average value of the reference voltage approach an average value of the feedback signal as much as possible.

According to various embodiments, there is also provided a luminaire including the abovementioned load drive circuit and at least one LED lamp as the at least one load of the load drive circuit.

These and other advantages of the present disclosure will become more apparent in light of the following detailed description of the preferred embodiments thereof combined with the accompanying drawings.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

Hereinafter, illustrative embodiments of the disclosure will be described with reference to the accompany drawings. For the purpose of clarity and conciseness, not all the features of the practical embodiments are described in the description. However, it will be appreciated that a lot of decisions related to the specific embodiments are necessary for developing such practical embodiments, so as to achieve the particular objects of the developers. Moreover, such decisions may vary from one embodiment to another. In addition, it will be appreciated that, although such developing may be very complex and time-consuming, it is routine work for persons skilled in the art in light of the present disclosure.

Also, for convenience of illustration, particular elements are used in some of the described illustrative embodiments. However, it should be understood that the load drive circuit and the load drive method applied in the disclosure are not limited thereto, and that the embodiments described herein are only for the purpose of illustration rather than limiting the disclosure. The scope of the disclosure is only limited by the appended claims and the equivalents thereof. Further, it should be noted that any reference to the term "connect" (connection) (including "connected in parallel", "connected in series," and so forth) hereinafter includes both direct and indirect connecting (connection). That is, between the connected components, circuits or modules, other components, circuits or modules can be present or absent.

Figure 1:
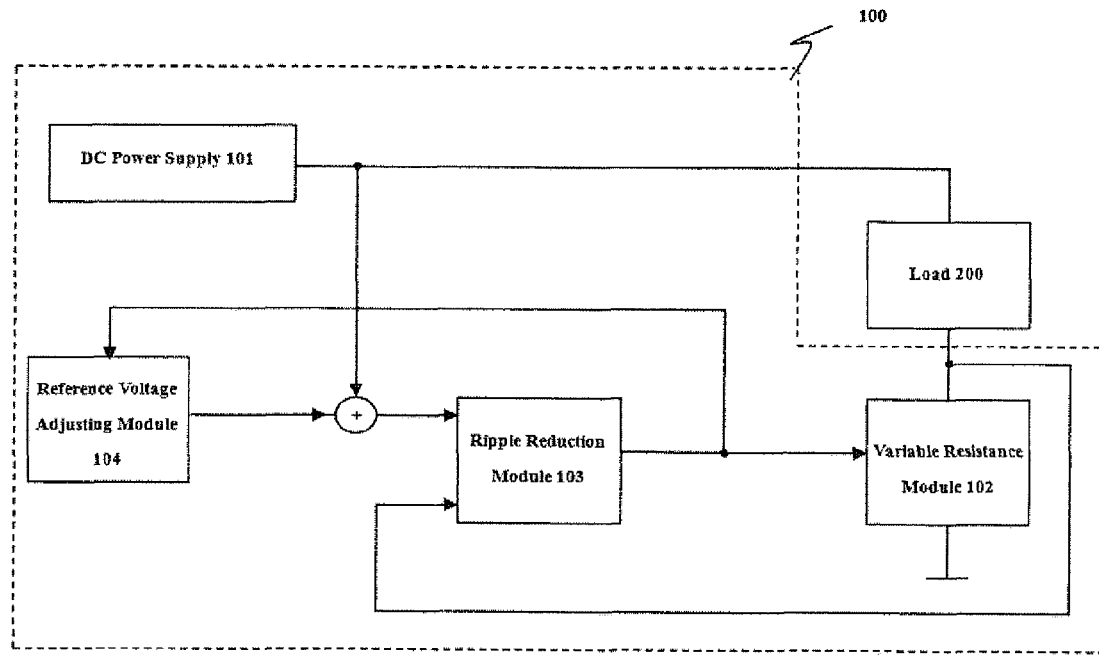
FIG. 1 shows a load drive circuit 100 according to an embodiment of the disclosure and one or more load 200 driven by the load drive circuit 100.

FIG. 1 shows a load drive circuit 100 according to an embodiment of the disclosure and one or more load 200 driven by the load drive circuit 100. The load drive circuit 100 includes a DC power supply 101, a variable resistance module 102, a ripple reduction module 103, and a reference voltage adjusting module 104. The DC power supply 101 provides the load 200 with a DC output voltage which is a DC voltage with a ripple. The variable resistance module 102 is connected to the load 200. The load drive circuit 100 generates a reference voltage based on the DC output voltage of the DC power supply 101, and obtains a feedback signal from the load 200. Based on the reference voltage and the feedback signal, the ripple reduction module 103 generates a variable resistance adjusting signal for adjusting a resistance value of the variable resistance module 102 to reduce a ripple of the load current. While the ripple reduction module 103 is working, the reference voltage adjusting module 104 adjusts an average value of the reference voltage based on the variable resistance adjusting signal outputted by the ripple reduction module 103, so that the average value of the reference voltage approaches an average value of the feedback signal as much as possible. Here, it should be noted that although it is illustrated in the circuit 100 that the variable resistance module 102 is connected to the load 200 in series, it is only illustrative. The connection between the variable resistance module 102 and the load 200 is not limited to a series connection and can be a parallel connection.

The principle of reducing the ripple by the load drive circuit 100 is utilizing the ohms law I=U/R. If the load drive circuit 100 can make the resistance value of the variable resistance module 102 follow the DC output voltage provided by the load drive circuit 100 to synchronously increase or decrease, the ripple of the DC output voltage can be 'resisted' for the load 200 so as to reduce the ripple of the load current.

The above control for the variable resistance module 102 is realized by the variable resistance adjusting signal generated by the ripple reduction module 103. In actual operation, because the ripple of the load current changes synchronously with that of the DC output voltage, the ripple reduction module 103 obtains a feedback signal from the load and generates a corresponding variable resistance adjusting signal based on the feedback signal (which reflects the ripple of the load current) and the reference voltage as a criterion, so as to control the resistance value of the variable resistance module 102 to change appropriately.

It is desired for the variable resistance adjusting signal to reflect the state of the ripple of the load current as much as possible, so that the resistance value of the variable resistance module 102 can be adjusted appropriately. At this time, the characteristics of the reference voltage used in generating the variable resistance adjusting signal have a great impact on the operation of the whole circuit.

In the present embodiment, the reference voltage is generated based on the DC output voltage, and thus is also a DC voltage with a ripple. This ripple changes synchronously with the ripple of the DC output voltage and generally is smaller than a ripple of the feedback signal. Because of the general characteristics of DC power supplies, a waveform of the ripple of the DC output voltage can keep substantially unchanged, but the average value thereof may change. The reference voltage generated based on the DC output voltage has similar characteristics, that is, the waveform of a ripple thereof keeps substantially unchanged. Therefore, if an average value of the reference voltage can be always made consistent with that of the feedback signal, the reference voltage can approach the feedback signal more than a constant DC reference voltage which is equal to the average value of the feedback signal does. Thereby, the generated variable resistance adjusting signal will not change too acutely and can control the resistance value of the variable resistance module 102 more conveniently.

However, if the average value of the reference voltage deviates from that of the feedback signal, it will result in an inappropriate variable resistance adjusting signal. In actual operation, such a deviation is very common. For example, there are cases when the DC power supply 101 changes, when external conditions such as the temperature change, and when the load 200 is replaced, and all of these cases can cause the average value of the reference voltage and/or that of the load current to change and make the two no longer correspond to each other.

At this time, the reference voltage adjusting module 104 of the present embodiment can find and adjust such an average value deviation. Particularly, in the present embodiment, because the ripple reduction module 103 generates a variable resistance adjusting signal based on the reference voltage and the feedback signal, when the average value of the reference voltage deviates from that of the feedback signal, the generated variable resistance adjusting signal will change and reflect such a deviation. Therefore, the reference voltage adjusting module 104 can accordingly adjust the average value of the reference voltage based on the variable resistance adjusting signal, so as to eliminate the deviation as much as possible to adapt to a possible fluctuation of the average value of the reference voltage and/or that of the load current.

Then, the ripple reduction module 103 generates a new variable resistance adjusting signal based on the reference voltage with the adjusted average value and the feedback signal, for controlling the resistance value of the variable resistance module 102. Because the average values of the reference voltage and the feedback signal are closer to each other at this time, the variable resistance adjusting signal generated by the reference voltage now can accurately reflect the ripple of the feedback signal itself, i.e., that of the load current, and will not acutely change. Thus, the signal will adjust the resistance value of the variable resistance module 102 more appropriately and then the ripple of the load current will be 'cancelled' better, which reduces the ripple of the load current while not making an excessive adjust. A new feedback signal obtained from the load current with the reduced ripple returns to the ripple reduction module 103 again. Such a continuous feedback procedure can make the ripple of the load current smaller and smaller. While the above feedback procedure is working, the reference voltage adjusting module 104 adjusts the reference voltage based on the changing variable resistance adjusting signal to make the average value of the reference voltage approach that of the feedback signal as much as possible.

The above controls of the ripple reduction module 103 and the reference voltage adjusting module 104 are continuously conducted in an interleaving manner. In theory, such a procedure can continue until the average value of the reference voltage approximates to that of the feedback signal and the waveform of the variable resistance adjusting signal is stable, then the circuit reaches a balance.

In a preferred embodiment, the resistance value of the variable resistance module 102 can be controlled based on a difference between an instant value of the reference voltage and an instant value of the feedback signal. It is because that the difference between the above instant values reflects an instant value of the ripple of the load current in a 'reversed phase' to a certain extent. Therefore, if the resistance value of the variable resistance module 102 is made to change oppositely according to the increasing or decreasing of this difference, the change of the instant value of the ripple of the load current can be 'cancelled' to a certain extent, thereby reducing the ripple.

Particularly, the ripple reduction module 103 can be configured to increase the generated variable resistance adjusting signal when a difference between the instant value of the reference voltage and the instant value of the feedback signal becomes larger and to decrease the generated variable resistance adjusting signal when the difference between the instant values becomes smaller. Meanwhile, the variable resistance module 102 is configured to decrease its resistance value when the variable resistance adjusting signal becomes larger and to increase its resistance value when the variable resistance adjusting signal becomes smaller. Herein, when considering the magnitude of the difference, it is not only the absolute value of the difference but also the sign of the difference that are taken into account.

Moreover, in this preferred embodiment, when the average value of the reference voltage is higher than that of the feedback signal, the difference between the instant value of the reference voltage and the instant value of the feedback signal will be caused to be too large, and then the value of the variable resistance adjusting signal outputted by the ripple reduction module 103 will be caused to be too large. Similarly, when the average value of the reference voltage is lower than that of the feedback signal, the value of the variable resistance adjusting signal outputted by the ripple reduction module 103 will be caused to be too small. Therefore, the average value of the reference voltage can be adjusted by the reference voltage adjusting module 104 based on the variable resistance adjusting signal being too large or too small.

Figure 7:
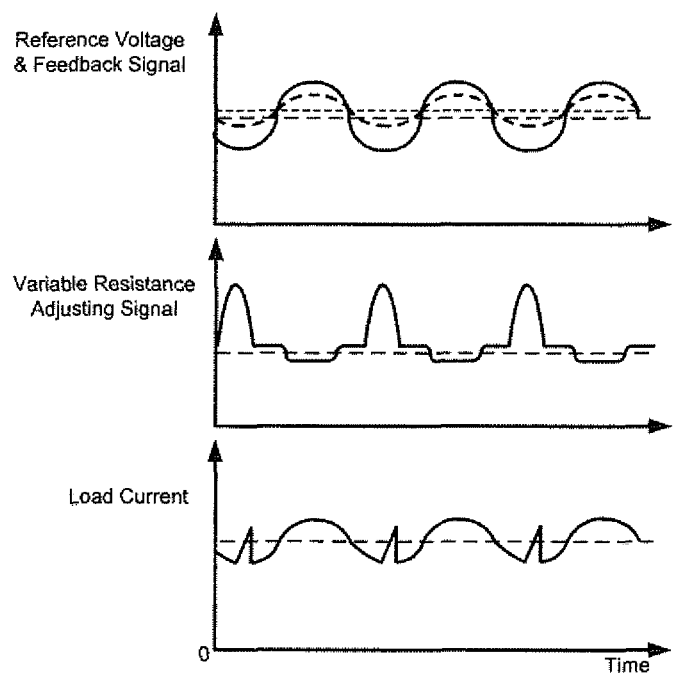
Figure 8:
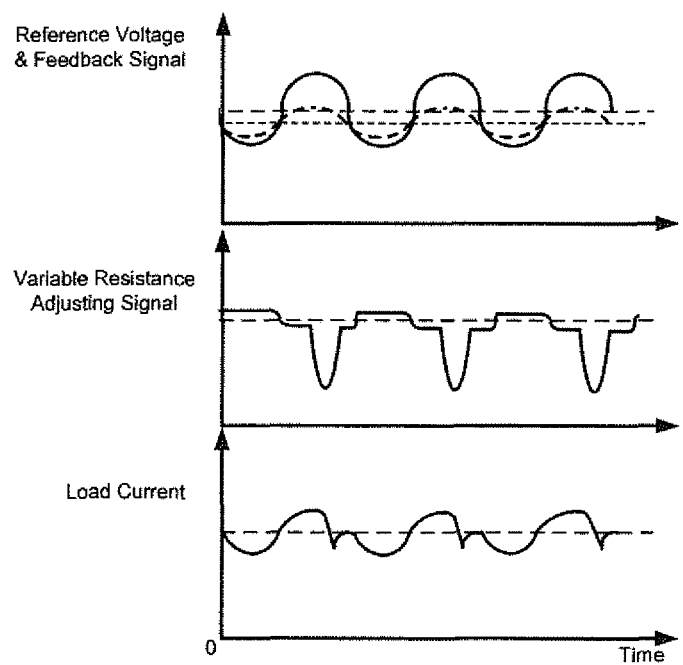

The preferred embodiment in which the average value of the reference voltage is adjusted by the reference voltage adjusting module 104 based on whether the variable resistance adjusting signal is too small or too large will be described hereinafter combined with FIGS. 6, 7 and 8. In each of FIGS. 6, 7 and 8, the upper figure shows both the reference voltage and the feedback signal, in which the waveform of dotted line is the reference voltage and the waveform of solid line is the feedback signal; the middle figure shows the variable resistance adjusting signal obtained based on a difference between an instant value of the reference voltage and an instant value of the feedback signal in the upper figure; and the lower figure shows the load current obtained with the variable resistance adjusting signal of the middle figure. It should be noted that, for convenience of illustration, the waveforms of FIGS. 7 and 8 are obtained supposing the feedback only be conducted once, i.e., the waveform of the feedback signal in each of the upper figures adjust the load current as shown in each of the lower figures by feeding back once, but the load current does not further provide a feedback signal. Further, although particular waveforms are used herein for description, it should be understood that these waveforms are only for an explanatory purpose rather than limiting the present disclosure.

Figure 6:
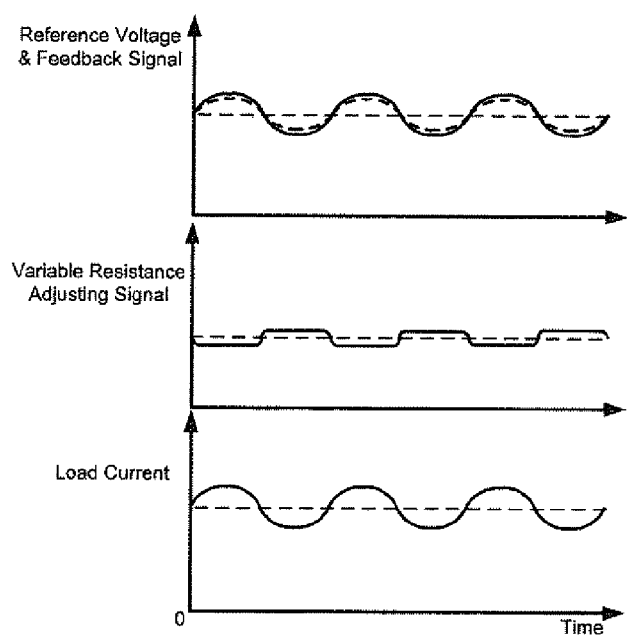
FIGS. 6-8 are schematic waveform diagrams of a reference voltage, a feedback signal, a variable resistance adjusting signal and a load current, respectively in the three cases that the average value of the reference voltage in the load drive circuit 100 approaches the average value of the load current, that it is too large, and that it is too small.

Firstly, FIG. 6 shows various waveforms obtained by an experiment when the average value of the reference voltage is consistent with that of the load current. At this time, the ripple of the load current is approximately a sinusoidal waveform being synchronous with the DC output voltage and has a relatively small magnitude, while the variable resistance adjusting signal is approximately a square wave of which a upper and lower range about a reference value (the dotted line in the figure) is very small. The particular feedback adjusting procedure is as follows: firstly, because a magnitude of the ripple of the feedback signal is always larger than that of the ripple of the DC output voltage and thus always larger than that of the ripple of the reference voltage, it can be imagined according to the waveforms in FIG. 6 that, if taking the 'relative zero-crossing point' timing of the ripple of the reference voltage (here, for convenience of illustration, a point at which an instant value of a DC signal with a ripple equals to an average value thereof is called as a 'relative zero-crossing point' of the DC signal) as a criterion, it can be deemed that a sign of a difference between an instant value of the reference voltage and an instant value of the feedback signal in a 'positive' half period (a half period having a 'peak' above the relative zero-crossing point) is opposite to that in a 'negative' half period (a half period having a 'valley' below the relative zero-crossing point). Secondly, in each positive half period and each negative half period, the reference voltage and the load current have average values being consistent with each other, and hence an absolute value of a difference between the instant values of the reference voltage and the load current will not be too large or too small. Therefore, the generated variable resistance adjusting signal can appropriately drive the variable resistance module 102 so as to appropriately adjust the ripple of the load current. Through continuous feedback, the load current (and thus the feedback signal) and the variable resistance adjusting signal reach a stable state as shown in FIG. 6.

If the average value of the reference voltage is too high, the state of FIG. 7 will arise. In FIG. 7, in the negative half period of the ripple of the reference voltage, since the average value of the reference voltage is too high, the above-mentioned difference between instant values is too large and changes greatly. Thus, the variable resistance adjusting signal has a relatively large 'peak' in the negative half period of the ripple of the reference voltage, that is, a maximum value of the signal is too large, which causes that a resistance value of the variable resistance module 102 is adjusted excessively acutely to become too small. Thus, the ripple of the load current is 'over-corrected' to cause an overshoot, that is, there appears an upward spike in the 'valley'. If the average value of the reference voltage is too low, the state of FIG. 8 will arise, which differs from the state of FIG. 7 in that, in the positive half period of the reference voltage, the variable resistance adjusting signal has a relatively deep 'valley' (the minimum value is too small) and there appears an 'undershooting' in a peak of the ripple of the load current, that is, there appears a sagging tip.

At this time, if taking an instant value of the variable resistance adjusting signal outputted by the ripple reduction module 103 when an instant value of the reference voltage equals to an instant value of the feedback signal as a reference value, the reference voltage adjusting module 104 can be configured to judge whether a maximum value of the variable resistance adjusting signal is too large or a minimum value thereof is too small according to whether a difference between the maximum value and/or the minimum value and the reference value, so as to adjust an average value of the reference voltage accordingly. That is, the reference voltage adjusting module 104 can be configured to decrease the average value of the reference voltage when a difference between a maximum value of the variable resistance adjusting signal and a reference value is higher than a predetermined threshold, and to increase the average value of the reference voltage when a difference between the reference value and a minimum value of the variable resistance adjusting signal is higher than a predetermined threshold. The predetermined threshold is determined according to circuit parameters, and can be adjusted according to an actual operating state of the circuit.

At this time, in the state of FIG. 7, the reference voltage adjusting module 104 will find that the difference between the maximum value of the variable resistance adjusting signal and the reference value is larger than a predetermined threshold and thus will decrease the average value of the reference voltage. Accordingly, a 'peak' of the variable resistance adjusting signal generated by the ripple reduction module 103 becomes smaller, so that the extent of the resistance value of the variable resistance module 102 being too small decreases, thereby decreasing an overshoot of the load current. In addition, regarding portions other than the 'peak' of the wave form of the variable resistance adjusting signal, they will reflect instant values of the ripple of the load current more accurately because the average value of the reference voltage is closer to that of the load current. Therefore, the resistance value of the variable resistance module 102 can be controlled better, so that the ripple of the load current can be decreased better. Such an adjusting procedure will be conducted continuously until the waveforms of the variable resistance adjusting signal and the load current do not change any more and are approximate to those shown in FIG. 6.

Further, it can be seen from FIGS. 7 and 8 that when the average value of the reference voltage deviates from that of the feedback signal, the obtained variable resistance adjusting signal is asymmetric. Therefore, alternatively, such an asymmetric property can be utilized to detect the deviation of the average value and to adjust the average value. That is, the above comparison between the maximum value and/or the minimum value of the variable resistance adjusting signal and the reference value can be converted to calculating a difference between the maximum value and the reference value and a difference between the reference value and the minimum value and making a comparison. Then, if the former is larger than the latter, it corresponds to that the maximum value is too large, otherwise, it corresponds to that the minimum value is too small. At this time, the reference voltage adjusting module 104 can be configured to decrease the average value of the reference voltage when a difference between a maximum value of the variable resistance adjusting signal and a reference value is larger than a difference between a minimum value of the variable resistance adjusting signal and the reference value, and otherwise, to increase the average value of the reference voltage.

In addition, when the average value of the reference voltage deviates not too much from that of the feedback signal, it can be deemed that a point at which a difference between instant values of the reference voltage and the feedback signal is zero will appear near a 'relative zero-crossing point' of the reference voltage, i.e., near a 'relative zero-crossing point' of the DC output voltage. Therefore, an instant value of the reference voltage at the timing of the 'relative zero-crossing point' of the DC output voltage can be taken as the above reference value. This 'relative zero-crossing point' can be determined by detecting a zero-crossing point of an AC/DC converter of the DC power supply 101.

Figure 9A:
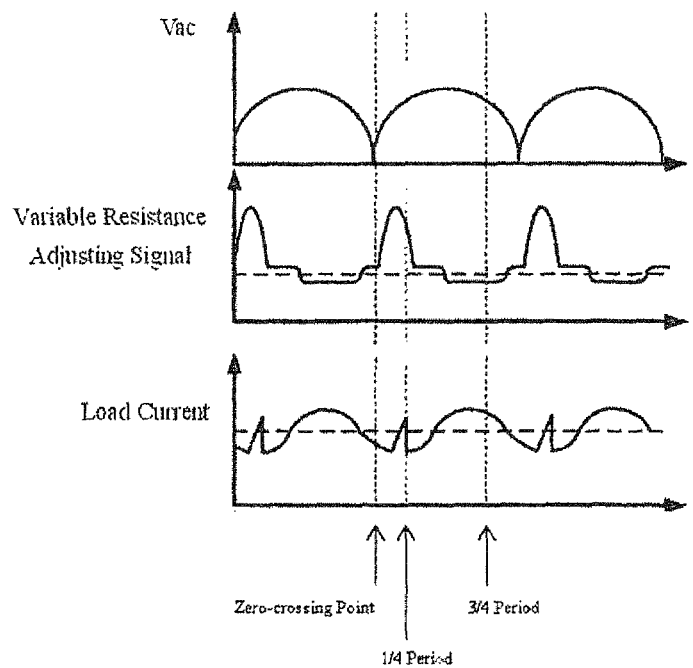
FIGS. 9A and 9B are illustrative diagrams illustrating the different timings for detecting a variable resistance adjusting signal.
Figure 9B:
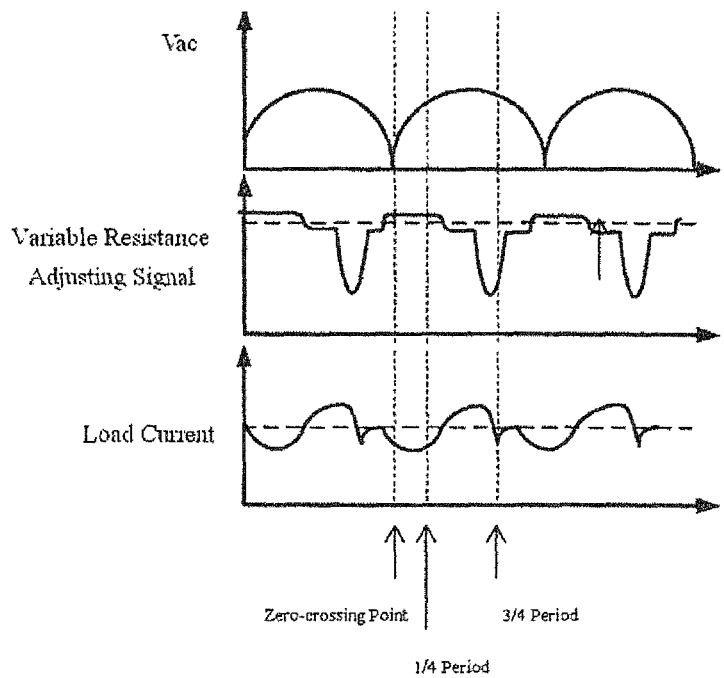

Thus, the reference voltage adjusting module 104 can be configured to detect a variable resistance adjusting signal at the timing of zero-crossing point of an output voltage of an AC/DC converter as the above reference value, and to respectively detect the variable resistance adjusting signals at one fourth period and three fourth period from the timing of the zero-crossing point as a maximum value and a minimum value of the variable resistance adjusting signal. FIGS. 9A and 9B show the above detection timings when the AC/DC converter is a rectifier bridge, wherein Vac is an output voltage of the rectifier bridge, and a) corresponds to the state of FIG. 7 (the average value of the reference voltage is too high) while b) corresponds to the state of FIG. 8 (the average value of the reference voltage is too low). It should be noted that, at this time, because of the phase and frequency relationship between Vac and the DC output voltage, if a timing of a zero-crossing point at a rising edge of Vac is chosen as a timing of detecting the reference value, a timing being one fourth DC output voltage period from the timing of the zero-crossing point can be taken as a timing of detecting a maximum value, and a timing being three fourth period from the timing of the zero-crossing point can be taken as a timing of detecting a minimum value. In addition, such a detection can be also conducted for an input AC power supply of the DC power supply 101, though not described in detail herein.

It can be noted from the drawings that the results obtained by the above detection are not at the real zero-crossing point or the real maximum and minimum values of the variable resistance adjusting signal, but they can reflect the zero-crossing point and the maximum and minimum values to a certain extent and thus can realize the object to be achieved. Therefore, all of the (relative) zero-crossing point, the maximum value and the minimum value mentioned in the present application should be understood as above.

In addition, in the above preferred embodiment, a particular example of the variable resistance module 102 is a field effect transistor (FET), with a equivalent resistance $R_{DS}=V_{DS}/I_{DS}$ between a source and a drain of the FET being a resistor connected in the circuit, wherein $V_{DS}$ is a voltage between the source and the drain and $I_{DS}$ is a current between the source and the drain. At this time, the variable resistance adjusting signal is used as a gate control voltage $V_{GS}$ of the FET and makes the FET operate at a variable resistance region. The equivalent resistance $R_{DS}=V_{DS}/I_{DS}$ between the source and the drain of the FET can be changed by changing the gate control voltage $V_{GS}$.

Figure 2:
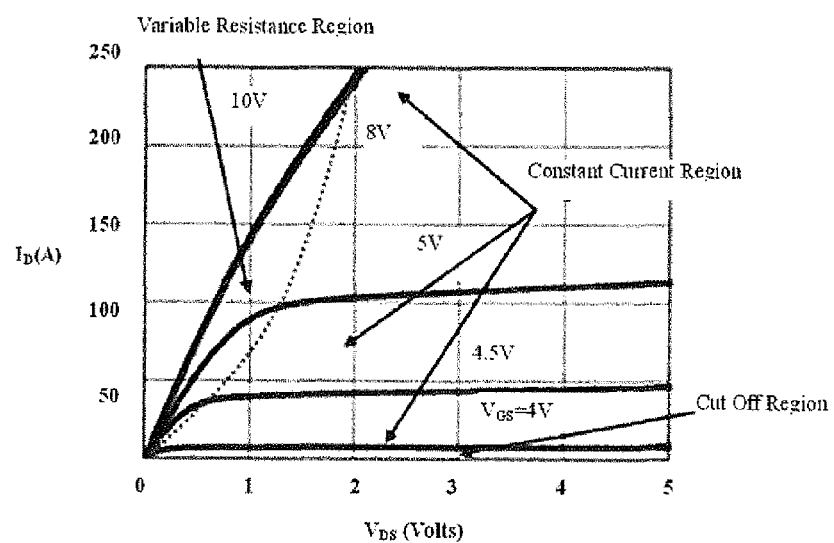
FIG. 2 illustratively shows an output characteristic curve of a field effect transistor.

FIG. 2 illustratively shows an output characteristics curve of the FET. In the figure, different curves correspond to different $V_{GS}$s, while slopes of different points on the same curve represent different $I_{DS}/V_{DS}$, with a reciprocal of the slopes being the equivalent resistances $R_{DS}$s. In the variable resistance region, the equivalent resistance $R_{DS}$ of the FET changes as $V_{DS}$ and $V_{GS}$ change. It can be seen that if $V_{DS}$ is constant, the larger the gate control voltage $V_{GS}$ is, the smaller the equivalent resistance $R_{DS}$ is. Therefore, $V_{GS}$ can be used as an adjusting signal for the equivalent resistance $R_{DS}$ of the FET.

The FET can be connected with at least one load among these circuit loads in parallel, and can also be connected with these loads in series. Since the FET shunts the loads connected thereto in parallel in case of parallel connection, a current flowing through the FET is relatively small, which is beneficial to the operation of the FET. In case of series connection, the entire current of the loads flows through the FET and the current of the FET may be relatively large, but the operation of the FET can also be ensured by selecting appropriate circuit parameters.

Another particular example of the variable resistance module 102 is a bipolar transistor (BJT) operating at a variable resistance region. The operating principle of the BJT is similar to that of the FET, and the BJT can be also connected with a load in parallel or in series. The variable resistance module 102 can also be any other suitable component.

In addition, the ripple reduction module in the above preferred embodiment can be realized as a comparison module. The comparison module compares the reference voltage with the feedback signal, and outputs a comparison result related to a difference between the reference voltage and the feedback signal as the variable resistance adjusting signal. For example, the comparison module can be an operational amplifier. The reference voltage is coupled to a positive input terminal $V_+$ of the operational amplifier and the feedback signal from a load is coupled to a negative input terminal $V_-$ of the operational amplifier, with an output $V_{out}$ of the amplifier being the variable resistance adjusting signal. Assuming that an amplification factor of the operational amplifier is K, $V_{out}=(V_+-V_-)\times K$. At this time, the above reference value equals to an output of the operational amplifier when an instant value of the reference voltage approximately equals to an instant value of the feedback signal.

Figure 3:
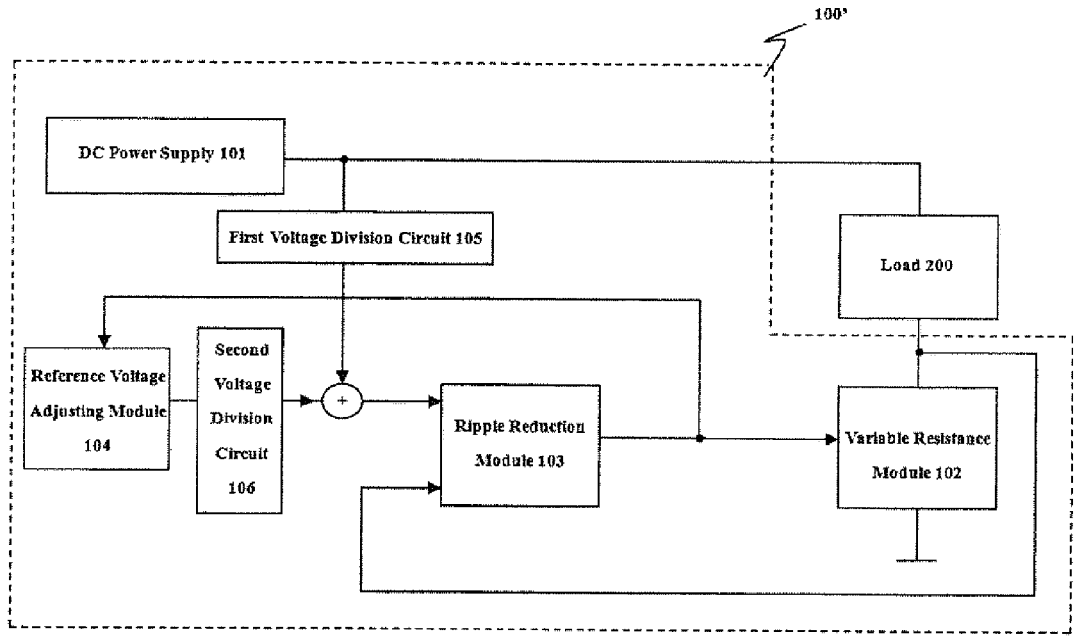
FIG. 3 shows a load drive circuit 100' according to another embodiment of the disclosure and one or more load 200 driven by the load drive circuit 100'.

Now referring to FIG. 3, FIG. 3 shows a load drive circuit 100' according to another embodiment of the disclosure. The load drive circuit 100' differs from the load drive circuit 100 of FIG. 1 in that it further includes a first voltage division circuit 105 and a second voltage division circuit 106 connected to the first voltage division circuit 105. In the load drive circuit 100', the first voltage division circuit 105 divides the DC output voltage to get a first voltage. Meanwhile, the reference voltage adjusting module 104 generates an adjusting voltage based on a variable resistance adjusting signal, and the second voltage division circuit 106 divides this adjusting voltage to get a second voltage and superposes the second voltage onto the first voltage as the reference voltage.

In addition, although the load drive circuit 100' shown in FIG. 3 includes both the first voltage division circuit 105 and the second voltage division circuit 106, it can be understood that the load drive circuit 100' can also include only the first voltage division circuit 105. At this time, the first voltage division circuit 105 divides the DC output voltage to get the first voltage as the reference voltage, and the reference voltage adjusting module 104 directly adjusts this reference voltage.

Figure 4:
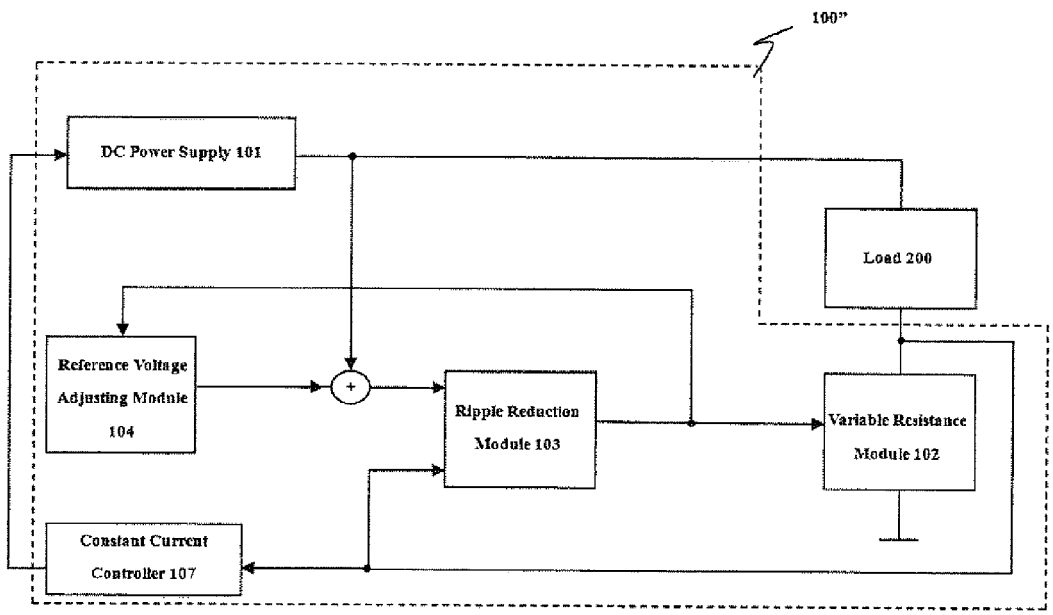
FIG. 4 shows a load drive circuit 100" according to yet another embodiment of the disclosure and one or more load 200 driven by the load drive circuit 100".

Next, turn to FIG. 4, which shows a load drive circuit 100" according to another embodiment of the disclosure. The load drive circuit 100" differs from the load drive circuit 100 of FIG. 1 in that it further includes a constant current controller 107. The constant current controller 107 obtains a feedback signal from the load 200, and controls a DC output voltage of the DC power supply 101 based on this feedback signal, so as to keep an average value of a load current constant.

The advantage of using the constant current controller 107 lies in that when the average value of the load current keeps constant, a change of a resistance value of the variable resistance module 102 only affects a ripple of the load current without affecting an average value of the load current. Thus, in the procedure of properly adjusting the resistance value of the variable resistance module 102 by the ripple reduction module 103 and the reference voltage adjusting module 104 so as to reduce the ripple of the load current, the feedback adjusting procedure itself will not further affect the average value of the load current, so that the procedure of ripple reduction can be finished more quickly. If there is not the constant current controller 107, the feedback adjusting procedure itself changes the average value of the load current, which prevents the procedure of ripple reduction from quickly entering a stable state.

The DC power supply 101 in each of the above embodiments can be realized by a power factor correction (PFC) converter, a boost converter, a buck converter, a buck-boost converter, and so on. The reference voltage adjusting module 104 can be a micro-controller (MCU), with one pin used for receiving the variable resistance adjusting signal from the ripple reduction module 103 and another pin used for providing an output to adjust the reference voltage. Various types of MCU can be used, for example, so long as it can realize the functions described above. The reference voltage adjusting module 104 can also be an application specific integrated circuit for realizing similar functions. The load 200 can be a light emitting diode (LED), but is not limited thereto. The first voltage division circuit 105 and the second voltage division circuit 106 can be realized by resistors. Moreover, the constant current controller 107 can also be realized by the MCU and occupy two pins of the MCU, with one pin for receiving a sampling current obtained from a load and one pin for outputting a control signal for the DC power supply 101 so that an average value of the DC output voltage of the DC power supply 101 changes according to an average value of the load current, so as to keep the average value of the load current constant. Those skilled in the art can understand that the above examples are only used for an illustrative purpose rather than for limiting the scope of the disclosure.

Figure 5:
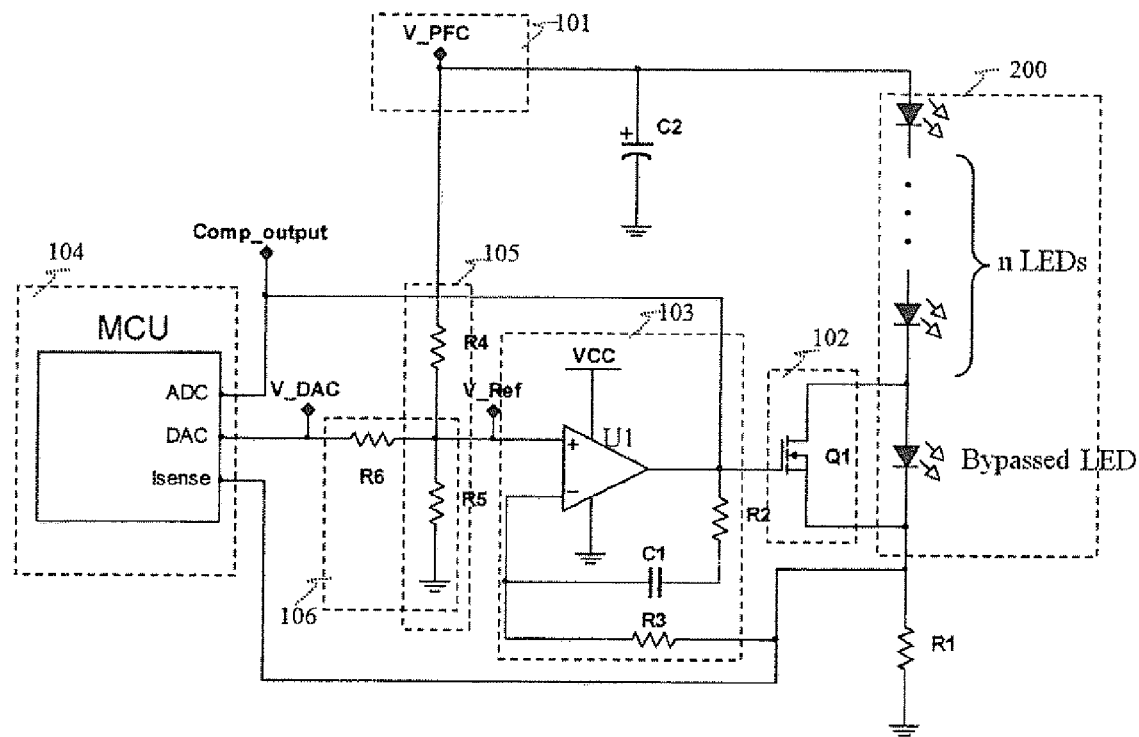
FIG. 5 is a circuit diagram of a particular example 500 of the load drive circuit according to the abovementioned embodiments of the disclosure.

In the following, one particular example 500 of the load drive circuit of each of the above embodiments as well as its operating procedure will be illustrated with reference to FIGS. 5-8 and 9A-9B. FIG. 5 is a circuit diagram of the load drive circuit 500. As shown in the figure, particular circuit components are used in FIG. 5 for every circuit module described above. However, as described above, not all of these circuit components are essential. Circuit components or modules not mentioned in the above embodiments can be omitted or replaced by a particular parameter design of the circuit. Meanwhile, as mentioned above, each of the circuit modules has not only one embodiment as shown in FIG. 5 but also various alternatives which will not be repeated herein. In conclusion, FIG. 5 is only used to illustrate the operating principle and the operating procedure of the circuit in more details through a particular example without limiting the scope of the disclosure.

In FIG. 5, V_PFC represents a DC output voltage of a buck PFC converter (not shown) used as the DC power supply 101, and is provided to n+1 LEDs connected in series used as the load 200. The field effect transistor Q1 operating at a variable resistance region is used as the variable resistance module 102, of which a source and a drain are respectively connected to two terminals of one LED, and thus connected to this LED in parallel. This LED that is connected in parallel with Q1 is called a bypassed LED. At this time, an equivalent resistance between the source and the drain of the field effect transistor Q1 is an equivalent resistance controlled by a gate control voltage of the field effect transistor Q1.

In addition, in FIG. 5, a voltage signal reflecting a current of the load LEDs is obtained from a sampling resistor R1, which is connected between the field effect transistor Q1 and the bypassed LED connected in parallel and the ground potential, and is provided to a negative input terminal of an operation amplifier U1 as a feedback signal. It should be noted that the sampling resistor R1 can be omitted here or the feedback signal can be obtained in other manners, as shown in FIGS. 1, 3, and 4. For example, a feedback signal representing a load current can be obtained at a node where the bypassed LED connects to the other n LEDs and then be provided to a negative input terminal of the operation amplifier U1 in any suitable manner. An input of a positive input terminal of the operation amplifier U1 is a reference voltage V_Ref. The resistors R4 and R5 form a first voltage division circuit 105 and generate a first voltage based on a DC output voltage V_PFC. Meanwhile, the MCU used as the reference voltage adjusting module 104 outputs a DC adjusting voltage V_DAC with variable magnitude. The adjusting voltage V_DAC is superposed on the first voltage from V_PFC, thus obtaining the reference voltage V_Ref which is provided to a positive input terminal of the operation amplifier U1. By adjusting the resistors R4, R5 and R6, an appropriate voltage division proportion can be achieved and an appropriate reference voltage V_Ref is obtained as follow:

$$V\_Ref = V\_PFC \times \frac{R_5}{R_4 + R_5} + V\_DAC \times \frac{R_5}{R_5 + R_6} \quad (1)$$

The operation amplifier U1 is used as the ripple reduction module 103. As required, the resistors R2, R3 and the capacitor C1 can be used to adjust the performance parameters of the operation amplifier U1. The operation amplifier obtains an operation amplifier output Comp_out=(V_Ref−V_)×K based on a difference between the reference voltage V_Ref at the positive input terminal and V_ at the negative input terminal, wherein K is an amplification factor of the operation amplifier U1 (this amplification factor can be adjusted by the resistors R2 and R3 and the capacitor C1). The operation amplifier output Comp_out is used as a gate voltage of the field effect transistor Q1, so as to control an equivalent resistance of Q1. It should be noted that the operation amplifier or the resistor R2 and R3 and the capacitor C1 should be properly selected to ensure that Q1 operates at an equivalent resistance region. When the reference voltage V_Ref is consistent with an average value of V_ of the negative input terminal (corresponding to an average value of the LED current), similar to the above discussion for the circuit 100 in FIG. 1, the equivalent resistance of Q1 can be appropriately controlled, so that a change of the LED current can be appropriately 'cancelled' to reduce the ripple.

The MCU used as the reference voltage adjusting module 104 generates the adjusting voltage V_DAC based on the operation amplifier output Comp_out which is used as the variable resistance adjusting signal. By outputting the DC adjusting voltage V_DAC with different magnitudes based on changes of the operation amplifier output Comp_out, an average value of the reference voltage V_Ref can be adjusted, so that the average value of V_Ref approaches an average value of the feedback signal V_ as much as possible, that is, approaching an average value of a current of the LEDs.

In addition, at the same time, the MCU can be also used as the constant current controller 107 to obtain a signal reflecting a load current and to control the DC output voltage V_PFC based on this signal, so as to keep the average value of the current of the LEDs unchanged. Here, although it is shown in FIG. 5 that the MCU obtains the signal reflecting the current of the LEDs from the sampling resistor R1, the particular manner of obtaining the signal is not limited to that shown in the figure, but can have different alternative manners, which is similar as that mentioned when the operation amplifier U1 obtains a voltage signal reflecting a current of the load. As explained above in the description for the constant current controller 107 of FIG. 4, when the operating condition changes, the MCU adjusts an average value (or an offset value) of the DC voltage V_PFC outputted by the PFC converter which is used as the DC power supply 101, so as to keep an average value of a current of the load LEDs constant. Thus, it can be ensured that the LEDs are under a stable, favorable operating condition, while it is also beneficial for reducing a ripple of the current of the LEDs.

Those skilled in the art can understand that, although the resistors R4, R5 and R6 are used in the circuit 500 as the first voltage division circuit 105 and the second voltage division circuit 106, they can be replaced with any other suitable components actually, or can be omitted as in the example of FIG. 1. Moreover, the resistor R1 used as the sampling resistor can be realized by other components, or can be omitted so that the feedback signal is obtained from the LEDs in other manners as shown in FIGS. 1, 3, and 4. The resistors R2 and R3 and the capacitor C1 allow to control the amplification factor of the amplifier U1 with respect to the positive and negative input terminals, which can be realized by any other suitable components in actual applications. In addition, the capacitor C2 is an electrolytic capacitor for reducing a ripple of V_PFC to a certain extent. If the ripple of V_PFC itself is relatively small, the capacitor C2 can be omitted. Of course, other circuit components can be used to realize the purpose of reducing the ripple of V_PFC.

According to the above description, it can be seen that there are disclosed not only a load drive circuit and a luminaire using the load drive circuit but also a load drive method for reducing a ripple of a load current flowing through at least one load. According to one of the embodiments thereof, the method includes: generating a reference voltage based on a DC output voltage of a DC power supply with an AC/DC converter; based on the reference voltage and a feedback signal from the at least one load, generating a variable resistance adjusting signal for adjusting a resistance value of a variable resistance module connected to the at least one load, so as to reduce the ripple of the load current; and adjusting an average value of the reference voltage based on the variable resistance adjusting signal, so as to make the average value of the reference voltage approach an average value of the feedback signal as much as possible.

Preferably, the variable resistance adjusting signal is increased when a difference between an instant value of the reference voltage and an instant value of the feedback signal becomes larger, and is decreased when the difference between the instant value of the reference voltage and the instant value of the feedback signal becomes smaller. Similarly, the resistance value of the variable resistance module becomes smaller when the variable resistance adjusting signal becomes larger, and becomes larger when the variable resistance adjusting signal becomes smaller.

Preferably, the average value of the reference voltage is decreased when a difference between a maximum value of the variable resistance adjusting signal and a reference value is higher than a predetermined threshold, and is increased when a difference between the reference value and a minimum value of the variable resistance adjusting signal is higher than the predetermined threshold reference value reference value.

Alternatively, the average value of the reference voltage is decreased when a difference between a maximum value of the variable resistance adjusting signal and a reference value is larger than a difference between the reference value and a minimum value of the variable resistance adjusting signal, and is increased when the difference between the maximum value and the reference value is smaller than the difference between the reference value and the minimum value.

Preferably, the reference value is an instant value of the variable resistance adjusting signal when the instant value of the reference voltage equals to the instant value of the feedback signal.

Preferably, the variable resistance adjusting signal at a timing of a zero-crossing point of an output voltage of the AC/DC converter or at a timing of a zero-crossing point of an input AC power supply is detected as the reference value, and the variable resistance adjusting signal at one fourth period from the timing of the zero-crossing point and the variable resistance adjusting signal at three fourth period from the timing of the zero-crossing point are respectively detected as the maximum value and the minimum value.

Preferably, the variable resistor adjusting signal is generated by comparing the reference voltage with the feedback signal.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A load drive circuit comprising:
   a DC power source configured to provide a DC output voltage for at least one load based on an output voltage of an AC/DC converter, the DC output voltage having a ripple;
   a variable resistance module to be connected to the at least one load;
   a ripple reduction module configured to generate, based on a reference voltage and a feedback signal from the at least one load, a variable resistance adjusting signal for adjusting the resistance of the variable resistance module so as to reduce a ripple of a load current flowing through the at least one load, wherein the reference voltage is generated based on the DC output voltage; and
   a reference voltage adjusting module configured to adjust the average value of the reference voltage based on the variable resistance adjusting signal, so as to make the average value of the reference voltage approach the average value of the feedback signal as much as possible, wherein
   the ripple reduction module is configured to increase the variable resistance adjusting signal when a difference between an instant value of the reference voltage and an instant value of the feedback signal becomes larger and to decrease the variable resistance adjusting signal when the difference between the instant value of the reference voltage and the instant value of the feedback signal becomes smaller; and
   the variable resistance module is configured so that the resistance value of the variable resistance module becomes smaller when the variable resistance adjusting signal becomes larger and the resistance value of the variable resistance module becomes larger when the variable resistance adjusting signal becomes smaller, wherein:
   the reference voltage adjusting module is configured to decrease the average value of the reference voltage when a difference between a maximum value of the variable resistance adjusting signal and a reference value is higher than a predetermined threshold or when a difference between a maximum value of the variable resistance adjusting signal and a reference value is larger than a difference between the reference value and a minimum value of the variable resistance adjusting signal, and to increase the average value of the reference voltage when a difference between the reference value and a minimum value of the variable resistance adjusting signal is higher than the predetermined threshold or when the difference between the maximum value and the reference value is smaller than the difference between the reference value and the minimum value.

2. The load drive circuit according to claim 1, wherein the variable resistance module comprises a field effect transistor or a bipolar transistor, and the ripple reduction module is configured so that the generated variable resistance adjusting signal makes the field effect transistor or the bipolar transistor operate at a variable resistance region.

3. The load drive circuit according to claim 2, wherein the field effect transistor or the bipolar transistor is connected in parallel with at least one of the at least one load.

4. The load drive circuit according to claim 2, wherein the field effect transistor or the bipolar transistor is connected in series with the at least one load.

5. The load drive circuit according to claim 1, wherein the reference value is an instant value of the variable resistance adjusting signal when the instant value of the reference voltage equals to the instant value of the feedback signal.

6. The load drive circuit according to claim 1, wherein:
   the reference voltage adjusting module is configured to detect the variable resistance adjusting signal at a timing of a zero-crossing point of an output voltage of the AC/DC converter or at a timing of a zero-crossing point of an input AC power supply as the reference value, and to detect the variable resistance adjusting signal at one fourth period from the timing of the zero-crossing point and the variable resistance adjusting signal at three fourth period from the timing of the zero-crossing point as the maximum value and the minimum value, respectively.

7. The load drive circuit according to claim 1, wherein the ripple reduction module comprises a comparison module configured to compare the reference voltage with the feedback signal and outputs a comparison result related to a difference between the reference voltage and the feedback signal as the variable resistance adjusting signal.

8. The load drive circuit according to claim 7, wherein the comparison module is an operation amplifier, and the reference value equals to an output of the operation amplifier when the instant value of the reference voltage equals to the instant value of the feedback signal.

9. The load drive circuit according to claim 1, further comprising a first voltage division circuit for dividing the DC output voltage to get a first voltage as the reference voltage.

10. The load drive circuit according to claim 9, further comprising a second voltage division circuit connected to the first voltage division circuit, wherein the reference voltage adjusting module generates an adjusting voltage based on the variable resistance adjusting signal, and the second voltage division circuit divides the adjusting voltage to get a second voltage and superposes the second voltage onto the first voltage to generate the reference voltage.

11. The load drive circuit according to claim 1, further comprising a constant current controller for keeping an average value of the load current constant.

12. A load drive method for reducing a ripple of a load current flowing through at least one load, the method comprising:
   generating a reference voltage based on a DC output voltage of a DC power supply with an AC/DC converter;
   based on the reference voltage and a feedback signal from the at least one load, generating a variable resistance adjusting signal for adjusting a resistance value of a variable resistance module to be connected to the at least one load, so as to reduce the ripple of the load current flowing through the at least one load; and
   adjusting an average value of the reference voltage based on the variable resistance adjusting signal, so as to make the average value of the reference voltage approach an average value of the feedback signal as much as possible.

13. The load drive method according to claim 12, wherein:
the variable resistance adjusting signal is increased when a difference between an instant value of the reference voltage and an instant value of the feedback signal becomes larger, and is decreased when the difference between the instant value of the reference voltage and the instant value of the feedback signal becomes smaller; and the resistance value of the variable resistance module becomes smaller when the variable resistance adjusting signal becomes larger, and becomes larger when the variable resistance adjusting signal becomes smaller.

14. The load drive method according to claim 12, wherein:
the average value of the reference voltage is decreased when a difference between a maximum value of the variable resistance adjusting signal and a reference value is higher than a predetermined threshold, and is increased when a difference between the reference value and a minimum value of the variable resistance adjusting signal is higher than the predetermined threshold.

15. The load drive method according to claim 14, wherein:
the variable resistance adjusting signal at a timing of a zero-crossing point of an output voltage of the AC/DC converter or at a timing of a zero-crossing point of an input AC power supply is detected as the reference value, and the variable resistance adjusting signal at one fourth period from the timing of the zero-crossing point and the variable resistance adjusting signal at three fourth period from the timing of the zero-crossing point are detected as the maximum value and the minimum value, respectively.

16. The load drive method according to claim 12, wherein:
the average value of the reference voltage is decreased when a difference between a maximum value of the variable resistance adjusting signal and a reference value is larger than a difference between the reference value and a minimum value of the variable resistance adjusting signal, and is increased when the difference between the maximum value and the reference value is smaller than the difference between the reference value and the minimum value.

17. The load drive method according to claim 14, wherein the reference value is an instant value of the variable resistance adjusting signal when the instant value of the reference voltage equals to the instant value of the feedback signal.

18. The load drive method according to claim 12, wherein the variable resistor adjusting signal is generated by comparing the reference voltage with the feedback signal.

19. A luminaire comprising a load drive circuit and at least one LED lamp as the at least one load of the load drive circuit, the load drive circuit comprising:

a DC power source configured to provide a DC output voltage for at least one load based on an output voltage of an AC/DC converter, the DC output voltage having a ripple;

a variable resistance module to be connected to the at least one load;

a ripple reduction module configured to generate, based on a reference voltage and a feedback signal from the at least one load, a variable resistance adjusting signal for adjusting the resistance of the variable resistance module so as to reduce a ripple of a load current flowing through the at least one load, wherein the reference voltage is generated based on the DC output voltage; and a reference voltage adjusting module configured to adjust the average value of the reference voltage based on the variable resistance adjusting signal, so as to make the average value of the reference voltage approach the average value of the feedback signal as much as possible, wherein the ripple reduction module is configured to increase the variable resistance adjusting signal when a difference between an instant value of the reference voltage and an instant value of the feedback signal becomes larger and to decrease the variable resistance adjusting signal when the difference between the instant value of the reference voltage and the instant value of the feedback signal becomes smaller; and the variable resistance module is configured so that the resistance value of the variable resistance module becomes smaller when the variable resistance adjusting signal becomes larger and the resistance value of the variable resistance module becomes larger when the variable resistance adjusting signal becomes smaller, wherein:

the reference voltage adjusting module is configured to decrease the average value of the reference voltage when a difference between a maximum value of the variable resistance adjusting signal and a reference value is higher than a predetermined threshold or when a difference between a maximum value of the variable resistance adjusting signal and a reference value is larger than a difference between the reference value and a minimum value of the variable resistance adjusting signal, and to increase the average value of the reference voltage when a difference between the reference value and a minimum value of the variable resistance adjusting signal is higher than the predetermined threshold or when the difference between the maximum value and the reference value is smaller than the difference between the reference value and the minimum value.

* * * * *